United States Patent
Rich et al.

(10) Patent No.: US 11,845,408 B2
(45) Date of Patent: Dec. 19, 2023

(54) DO-IT-YOURSELF AUTOMOTIVE REPAIR KIT

(71) Applicant: Innova Electronics Corporation, Irvine, CA (US)

(72) Inventors: David Rich, Irvine, CA (US); Phuong Pham, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 293 days.

(21) Appl. No.: 17/210,310

(22) Filed: Mar. 23, 2021

(65) Prior Publication Data
US 2022/0306050 A1 Sep. 29, 2022

(51) Int. Cl.
*B60S 5/00* (2006.01)
*G07C 5/08* (2006.01)
*G06Q 10/20* (2023.01)

(52) U.S. Cl.
CPC .............. *B60S 5/00* (2013.01); *G07C 5/0808* (2013.01); *G06Q 10/20* (2013.01)

(58) Field of Classification Search
CPC ..... B60S 5/00; G07C 5/0808; G07C 2205/02; G06Q 10/20
See application file for complete search history.

(56) References Cited

U.S. PATENT DOCUMENTS 9,582,944 B2 * 2/2017 Merg ................. G07C 5/08
11,034,465 B1 * 6/2021 Brady ................ G06Q 10/20

OTHER PUBLICATIONS

4×4AirSeals "Delivery Valve Repair kit . . . " <https://4x4airseals.com/product/delivery-valve-repair-kit-including-retaining-nut-for-oem-hitachi-aftermarket-dunlop-compressors-related-to-c1a20-64-diagnostic-trouble-code>; Archived: Aug. 8, 2020 (Year: 2020).*

* cited by examiner

*Primary Examiner* — Michael V Kerrigan
(74) *Attorney, Agent, or Firm* — Stetina Brunda Garred & Brucker

(57) ABSTRACT

A diagnostic condition indexed kit for implementing a do-it-yourself automotive repair includes at least one replacement part compatible with a specified vehicle, at least one tool for installing the replacement part(s) in the specified vehicle, and packaging containing the replacement part(s) and the tool(s). The packaging may include an indicator, accessible from outside the packaging, referencing the specified vehicle and a diagnostic condition associated with the specified vehicle that is repairable by installation of the replacement part(s). A scan tool or app-loaded mobile device may be operable to communicate with an onboard computer of a vehicle and receive one or more repair codes associated with the diagnostic condition and vehicle-identifying information from the onboard computer and identify the kit based on the received repair code(s) and vehicle-identifying information. A server may match the repair code(s) and vehicle diagnostic information to a kit identifier.

38 Claims, 3 Drawing Sheets

| Kit ID | Diagnosis / Solution | Vehicle Repair Data | Kit Contents | Package Spec. | Product Data |
|---|---|---|---|---|---|
| $ID_1$ | $Fix_1$ | (Vehicle data, DTCs, live data, etc.) | $Part_1$ $Toolset_1$ | (LxWxH, etc.) | (Inventory, price, store, website, etc.) |
| $ID_2$ | $Fix_2$ | (Vehicle data, DTCs, live data, etc.) | $Part_2$ $Toolset_2$ | (LxWxH, etc.) | (Inventory, price, store, website, etc.) |
| $ID_3$ | $Fix_3$ | (Vehicle data, DTCs, live data, etc.) | $Part_3$ $Toolset_3$ | (LxWxH, etc.) | (Inventory, price, store, website, etc.) |
| ... | ... | ... | ... | ... | ... |
| $ID_n$ | $Fix_n$ | (Vehicle data, DTCs, live data, etc.) | $Part_n$ $Toolset_n$ | (LxWxH, etc.) | (Inventory, price, store, website, etc.) |

FIG. 2

DO-IT-YOURSELF AUTOMOTIVE REPAIR KIT

CROSS-REFERENCE TO RELATED APPLICATIONS

Not Applicable

STATEMENT RE: FEDERALLY SPONSORED RESEARCH/DEVELOPMENT

Not Applicable

BACKGROUND

Automotive technology has become far more complex in recent times. Identifying the vehicle defect may require detailed knowledge of engine functionality and the ability to access and understand vehicle diagnostic information. Further, in many cases different engines from different vehicle manufacturers may generate different diagnostic information, and the same repair may be more or less difficult on different vehicles, with a different set of parts and tools to make needed repairs.

Despite these complexities, vehicle owners may want to make repairs or perform maintenance on their vehicle by themselves. In some cases, this may be motivated by a desire to avoid the expense of going to a professional mechanic, or to provide some satisfaction by making certain repairs by themselves. In other cases the desire to do it yourself may be motivated by a desire to avoid social interactions that may expose the vehicle owner to health concerns that may be common in a community. Whatever the motivation, there is a need to assist such do it yourselfers (DIYers) to readily identify needed repairs and the parts needed to implement those repairs for their specific vehicle without extensive effort or research.

Some DIYers may be concerned only with making currently need repairs as simply as possible. Other DIYers may be interested in also replacing other parts that are likely to need replacement within a mileage range beyond the current mileage of their vehicle, such as where the vehicle will be used for an upcoming vacation or other extended trip or use. In yet other cases, a DIYer may want to take advantage of the effort to make the needed repair to also replace parts that are made easily accessible as a consequence of making the needed repair.

As will be apparent, it would be useful to provide a simple way to be able to identify needed repairs and tools to make those repairs, as well as additional repairs/part replacements that may be of interest to the vehicle owner. Preferably the identification of the repairs, parts and tools would be uniquely selected to be suitable for a specific year/make and model vehicle and could be prepackaged in a manner that could be sent to the vehicle owner at his/her home, or readily obtained from a parts retailer without the need for extensive research by a customer service technician. Ideally the only information needed to enable the delivery of such needed repair information and tools needed to implement those repairs could be provided by simply connecting a dongle or other data acquisition device to the vehicle diagnostic port located in the passenger compartment, typically under the steering wheel. Without even opening the hood, information specifically identifying the vehicle and information indicating the diagnostic condition of the vehicle can be obtained, processed, and communicated to the vehicle owner using proprietary products and techniques provided by Innova Electronics Corporation, of Irvine California, the owner of the present application. Those products and techniques enable deriving the most likely diagnostic solution for the specific diagnostic information received from the vehicle identifying vehicle-specific parts/tools information for making currently needed repairs, and predicted mileage ranges for additional repairs for that vehicle. That information may be correlated to the identification of pre-packaged repair kits that can be readily purchased from a retailer and installed in the vehicle.

These and other implementations and advantages achievable using the present invention are described in further detail below.

BRIEF SUMMARY

The present disclosure contemplates various systems and methods for overcoming the above drawbacks accompanying the related art. A vehicle owner can purchase a repair kit that is specifically designed not only for the vehicle owner's particular vehicle but for the specific diagnostic condition of that vehicle. The kit comes with everything the vehicle owner will need to complete the repair, from the replacement part itself to the highly specialized (and often vehicle-specific) tools that are needed to install the replacement part in that particular vehicle. Higher tier versions of the same kit can additionally include optional replacement parts that are predicted to need replacement based on the diagnostic condition of the vehicle or that are convenient to replace at the same time due to their location in the vehicle. The technology for identifying the needed kit for the vehicle owner, as well as for assembling the kits in the first place, piggybacks on state-of-the-art vehicle diagnostics technology that is compatible with automotive scan tools and consumer mobile devices such as smartphones. Using a scan tool or mobile application, the vehicle owner can read vehicle diagnostics information and vehicle-identifying information from the vehicle's onboard computer and upload the data to a server. By referencing a database of kits, the server can determine which kit or kits are appropriate for the vehicle owner and provide the information to the scan tool or mobile device. The vehicle owner can see what kit to buy (and even where it is available for purchase) right on the scan tool or mobile device screen.

It is also advantageous for the kits to have the relevant vehicle-identifying and vehicle diagnostic information right on the packaging. That way, a vehicle owner can browse kits at an auto parts store and find an appropriate kit for his/her vehicle. There is no need to research how to do the repair, what tools to buy, etc. since everything is included in the kit. In some cases, the vehicle owner may not even be experiencing a problem with the vehicle and may simply be looking for a kit based on the type of vehicle and mileage. For example, the vehicle owner may be planning to go on a road trip and wish to ensure that the vehicle will not break down in the foreseeable future. The right kit can be found for the specific vehicle/mileage/condition either by looking at the packaging or by running a predictive diagnostics routine using a scan tool or app-loaded mobile device. By the same token, auto parts stores can stock kits according to their type or purpose as indicated on the packaging. In addition, by providing a vehicle diagnostics kiosk in the parking lot, the store can offer a vehicle diagnostics service to customers, with the result of the analysis directing the customer to a specific kit or kits that are currently available in the store. In this way, the repair kits can be of great benefit to auto parts stores by driving business into the stores and minimizing the time and expertise needed to properly service the customer, all while empowering vehicle owners to repair and maintain their own vehicles using state-of-the-art vehicle diagnostics technology.

One aspect of the embodiments of the present disclosure is a diagnostic condition indexed kit for implementing a do-it-yourself automotive repair of a particular diagnostic condition of a specific vehicle, as indicated by diagnostic information obtained from the vehicle. The kit may comprise at least one replacement part compatible with a specified vehicle (e.g. a specified vehicle year, make, model, engine), at least one tool for installing the replacement part(s) in the specified vehicle, and packaging containing the replacement part(s) and the tool(s). The packaging may include an indicator, accessible from outside the packaging, referencing the specified vehicle and a diagnostic condition associated with the specified vehicle that is repairable by installation of the replacement part(s).

The indicator may comprise at least one repair code associated with the diagnostic condition.

The repair code(s) may comprise a plurality of vehicle diagnostic trouble codes (DTCs). The DTCs may be generated by the specified vehicle in response to the diagnostic condition associated with the specified vehicle.

The indicator may further comprise an urgency rating associated with the diagnostic condition of the specified vehicle. The urgency rating may be indicated by one or more colors applied to the indicator. The urgency rating may be derived from an urgency level associated with the diagnostic condition and/or the replacement part(s).

The kit may further comprise at least one optional replacement part that is not needed for repairing the diagnostic condition associated with the specified vehicle. The indicator may comprise a plurality of vehicle diagnostic trouble codes (DTCs) at least one of which is associated with the optional replacement part(s). An installation location of the optional replacement part(s) in the specified vehicle may be made accessible during repair of the diagnostic condition. The optional replacement part(s) may be predicted to need replacement when the specified vehicle reaches a specified mileage.

Another aspect of the embodiments of the present disclosure is a system comprising the above kit and a scan tool. The scan tool may be operable to connect to an onboard computer of the specified vehicle and receive the repair code(s) and vehicle-identifying information from the specified vehicle. The scan tool may identify the kit associated with the received repair code(s) and the vehicle-identifying information. For example, the scan tool may be operable to identify the kit in response to a match between the received repair code(s) and those of the kit and between the received vehicle-identifying information and the specified vehicle of the kit. The system may further comprise a server configured to receive, from the scan tool, the repair code(s) and the vehicle-identifying information and to match the diagnostic data and the repair code(s) and the vehicle-identifying information to a kit identifier identifying the kit. The server may communicate the kit identifier to the scan tool. The scan tool may be operable to identify the kit based on the kit identifier received from the server and present (e.g. display) the identified kit to a user of the scan tool. The process may proceed autonomously from connection of the scan tool to the vehicle diagnostic port (or from receipt of the vehicle information at the scan tool) to identification of the proper kit. The process may continue to enable an e-commerce transaction for the purchase of the kit from a participating retailer.

Another aspect of the embodiments of the present disclosure is a system comprising the above kit and a mobile device such as a smartphone or tablet. The mobile device may be in communication with the specified vehicle and operable to receive (e.g. by short-range wireless communication such as Bluetooth) the repair code(s) and vehicle-identifying information from the specified vehicle (e.g. via a dongle-type scan tool connected to the vehicle) and to identify a kit including the replacement part(s) and the tool(s). The mobile device may receive the repair code(s) and vehicle-identifying information from a dongle-type scan tool connected to an onboard computer of the specified vehicle, for example. The mobile device may be operable to identify the kit in response to a match between the received repair code(s) and those of the kit and between the received vehicle-identifying information and the specified vehicle of the kit. The system may further comprise a server configured to receive, from the mobile device, the repair code(s) and the vehicle-identifying information and to match the diagnostic data and the repair code(s) and the vehicle-identifying information to a kit identifier identifying the kit. The server may communicate the kit identifier to the mobile device. The mobile device may be operable to identify the kit based on the kit identifier received from the server and present (e.g. display) the identified kit to a user of the mobile device. The process may proceed autonomously from receipt of the vehicle information at the mobile device to identification of the proper kit. The process may continue to enable an e-commerce transaction for the purchase of the kit from a participating retailer.

Another aspect of the embodiments of the present disclosure is a method of providing vehicle specific or vehicle condition specific do-it-yourself automotive repair kits. The method may comprise storing a plurality of vehicle repair records in a database, each of the vehicle repair records being stored in association with vehicle specific diagnostic information generated by a vehicle and an associated vehicle diagnostic condition. The method may further comprise generating a subset of common vehicle diagnostic conditions associated with specific vehicles from the vehicle repair records in the database and, for each of the common vehicle diagnostic conditions, i) assembling a first corresponding repair kit including one or more vehicle-specific replacement parts compatible with the associated vehicle and the vehicle diagnostic condition and one or more tools for installing the replacement part(s) in the associated vehicle and ii) packing the replacement part(s) and the tool(s) in a packaging. The packaging may include an indicator identifying the vehicle and at least one vehicle diagnostic condition associated with that vehicle that is addressed by installation of the replacement part(s).

The indicator may include at least one vehicle diagnostic trouble code (DTC) included within the vehicle specific diagnostic information. The method may further comprise indexing the repair kits in accordance with the associated vehicle and the at least one DTC.

The method may further comprise, for at least one of the common vehicle diagnostic conditions, i) assembling a second corresponding repair kit including the one or more vehicle-specific replacement parts compatible with the associated vehicle and the vehicle diagnostic condition, the one or more tools for installing the replacement part(s) in the associated vehicle, and at least one optional replacement part that is not needed for repairing the vehicle diagnostic condition of the associated vehicle and is not included in the first corresponding repair kit and ii) packing the replacement part(s), the tool(s), and the at least one optional replacement part in a packaging, the packaging including an indicator identifying the vehicle and at least one vehicle diagnostic condition associated with that vehicle that is addressed by installation of the replacement part(s). For the at least one of the common vehicle diagnostic conditions, the indicator included in the packaging of the second corresponding repair kit may comprise a plurality of vehicle diagnostic trouble codes (DTCs) at least one of which is associated with the optional replacement part(s). The optional replacement part(s) may be predicted to need replacement when the associated vehicle reaches a specified mileage. An installation location of the optional replacement part(s) in the associated vehicle may be made accessible during repair of the vehicle diagnostic condition.

The method may further comprise, for at least one of the common vehicle diagnostic conditions, i) assembling a third corresponding repair kit including the one or more vehicle-specific replacement parts compatible with the associated vehicle and the vehicle diagnostic condition, the one or more tools for installing the replacement part(s) in the associated vehicle, the at least one optional replacement part, and at least one further optional replacement part that is not needed for repairing the vehicle diagnostic condition of the associated vehicle and is not included in either of the first and second corresponding repair kits and ii) packing the replacement part(s), the tool(s), the at least one optional replacement part, and the at least one further optional replacement part in a packaging, the packaging including an indicator identifying the vehicle and at least one vehicle diagnostic condition associated with that vehicle that is addressed by installation of the replacement part(s). For the at least one of the common vehicle diagnostic conditions, the indicator included in the packaging of the third corresponding repair kit may comprise a plurality of vehicle diagnostic trouble codes (DTCs) at least one of which is associated with the further optional replacement part(s). The further optional replacement part(s) may be predicted to need replacement when the associated vehicle reaches a specified mileage. An installation location of the further optional replacement part(s) in the associated vehicle may be made accessible during repair of the vehicle diagnostic condition.

Another aspect of the embodiments of the present disclosure is a non-transitory program storage medium on which are stored instructions executable by a processor or programmable circuit to perform operations for supporting a do-it-yourself automotive repair. The operations may comprise receiving one or more repair codes and vehicle-identifying information from a vehicle and identifying a repair kit based on the code(s) and the vehicle identifying information. The repair kit may include at least one replacement part compatible with the vehicle, at least one tool for installing the replacement part(s) in the vehicle, and packaging containing the replacement part(s) and the tool(s). The packaging may include an indicator, accessible from outside the packaging, referencing a kit identifier corresponding to the repair kit. The operations may further comprise outputting the kit identifier corresponding to the identified repair kit.

The identifying of the repair kit may include transmitting the one or more repair codes and the vehicle identifying information to a remote server and receiving the kit identifier from the remote server.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 shows example contents of a DIY repair kit data storage; and

DETAILED DESCRIPTION

The present disclosure encompasses various embodiments of systems and methods, usable by professionals and the general public alike, for implementing do-it-yourself (DIY) automotive repairs. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
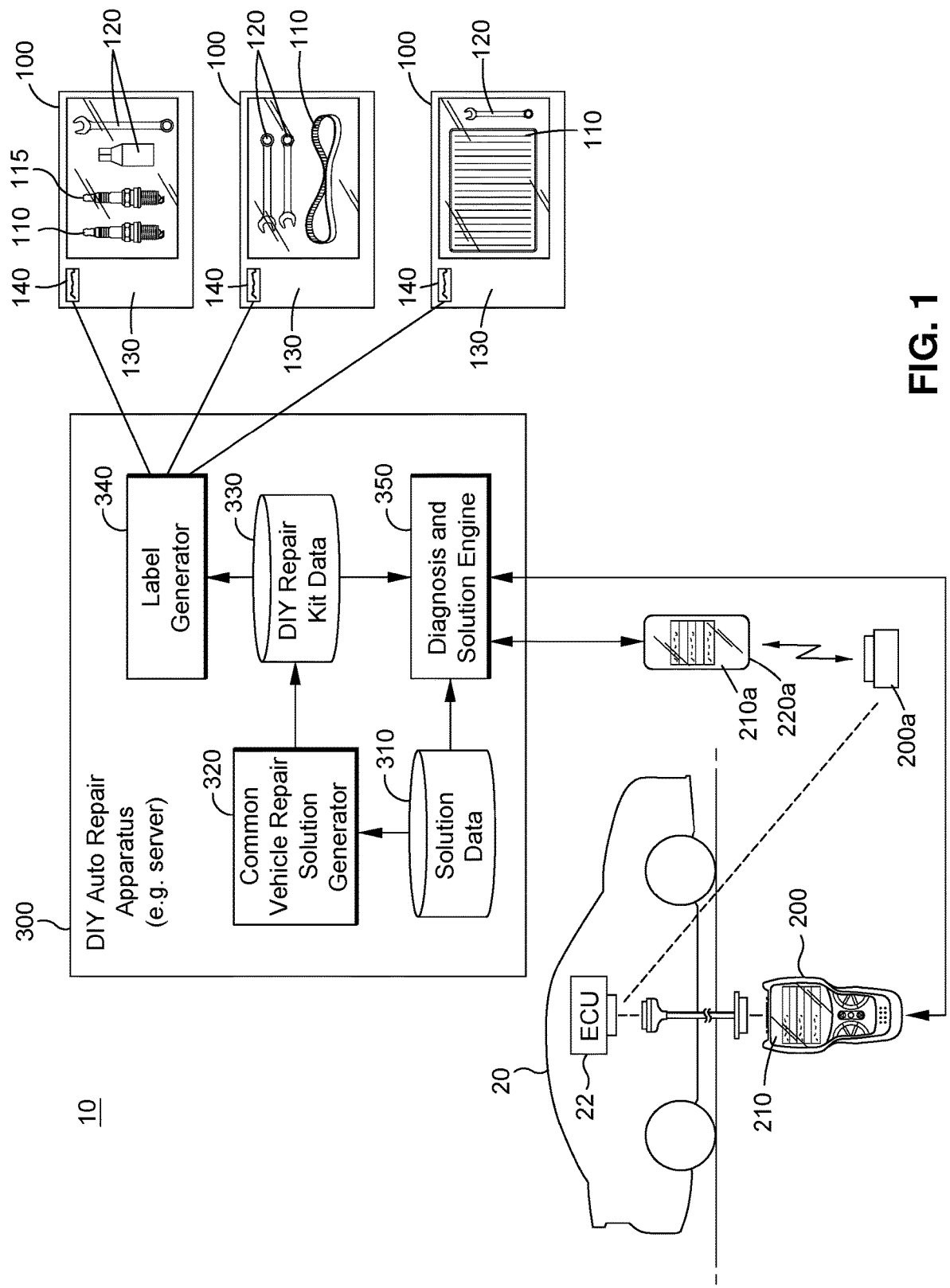
FIG. 1 shows an example system for implementing DIY automotive repairs according to an embodiment of the present disclosure.

FIG. 1 shows an exemplary system 10 for implementing DIY automotive repairs according to an embodiment of the present disclosure. In addition to providing an efficient way for hobbyists and professionals to find and install needed auto parts, the system 10 may extend the substantial cost savings of DIY automotive repairs to the public at large, including ordinary consumers with limited knowhow, all while driving auto parts sales to the benefit of the auto parts retail industry. To this end, the system 10 may provide for and include one or more kits 100 that may be sold to the general public in a retail store or on an e-commerce site, for example. Each of the kits 100 may be for implementing a specific DIY automotive repair and may include one or more replacement parts 110 compatible with a specified vehicle (e.g. a particle vehicle year, make, model, engine type) along with one or more tools 120 for installing the replacement part(s) 110 in that vehicle model(s) (which may in some cases differ from the tools 120 needed to install that same replacement part 110 in a different vehicle model). The replacement part(s) 110 may include, for example, one or more spark plugs, a belt, or an air filter as illustrated in FIG. 1, or any other auto part such as a mass air flow sensor, oxygen sensor, temperature sensor, battery, alternator, starter, clutch, fuel injector, fuel filter, oil filter, brake pads, shocks, struts, fuel pump, water pump, windshield wiper, side mirror, or taillight, and the corresponding tools may include an appropriate wrench (e.g. a torque wrench), socket (e.g. spark plug socket), ratchet, grease (e.g. anti-seize lubricant, dielectric grease), screwdriver, pliers, etc. as may be needed to install the replacement part in the particular vehicle. Suitable instructions for performing the installation or other repair may be included as well.

Unlike conventional products that are sold in auto parts stores, the packaging 130 that contains the replacement part(s) 110 and tool(s) 120 of a given kit 100 may include a label or other indicator 140, accessible from outside the packaging 130, referencing the specified vehicle and a diagnostic condition associated with the specified vehicle that is repairable by installation of the replacement part(s). In this way, the appropriate kit 100 may easily be selected to implement a specific vehicle repair solution for a particular vehicle. For example, the information provided by the indicator 140 may include vehicle diagnostic information such as one or more repair codes associated with the diagnostic condition. An example of the repair code(s) may be a plurality of diagnostic trouble codes (DTCs). By virtue of such information being printed or otherwise provided on the packaging 130, a potential buyer may simply compare the indicator 140 to the vehicle diagnostic information output on the screen 210 of a scan tool 200 used to diagnose his or her vehicle 20 or on the screen 210a of a mobile device 220a connected to a dongle-type scan tool 200a used to diagnose his or her vehicle 20. Conversely, the information provided by the indicator 140 may be a product number or other kit identifier of the kit 100 itself, with the scan tool 200 or mobile device 220a being configured to output the same kit identifier in response to a relevant diagnosis of the vehicle 20. In either case, the buyer is able to easily associate a particular kit 100 on the shelf of a store with a particular vehicle repair solution for his or her vehicle 20, making DIY repair possible with limited knowledge of automotive diagnostics and repairs. By providing such kits 100 to consumers, an auto parts retailer can integrate its products with vehicle diagnostics systems, leveraging modern vehicle diagnostics technology to drive sales.

When a person uses a kit 100 to install a replacement part 110, there may be various other related parts that are not necessarily in need of repair but must be replaced as a practical matter in order to install the replacement part 110. For example, when replacing a valve, there may be a valve cover gasket that must be removed in order to access the valve, and it may not be possible to reinstall the same valve cover gasket. As such, a replacement valve cover gasket may be regarded as a required secondary part to be installed when replacing the valve. It is contemplated that the kit 100 may include such secondary parts in addition to the particular replacement part 110 that represents the repair solution for addressing the diagnostic condition of the vehicle 20.

In addition to such secondary parts that may be necessary for the installation of certain replacement parts 110 in certain vehicles 20, it is also contemplated that the kit 100 may include one or more optional parts 115 that are neither in need of replacement nor required when installing the replacement part 110. Instead, the optional part(s) 115 may be those parts that are easily replaced during the installation of the replacement part 110, such that it is advisable to replace them at the same time for the sake of efficiency. For example, in a case where the replacement part 110 is a spark plug, the installation may be relatively straightforward on some vehicles 20, but more difficult and labor intensive on others, such as with a compact engine that requires removal of the battery and/or engine intake tubing for access or with a transverse engine that may require removal of the wiper cowl. For such difficult installations and hard-to-access areas of the vehicle 20, the kit may include optional part(s) 115 that may be installed in proximity to the replacement part 110 while that area of the vehicle 20 is being accessed. In the example of FIG. 1, an exemplary optional part 115 is illustrated as being a second spark plug (representing a full set of spark plugs for the engine, for example), but the optional part(s) 115 may include other parts that are not duplicates of the replacement part 110, such as spark plug leads/wiring or even functionally unrelated parts that happen to be accessible during the installation of the replacement part 110. For example, the optional part(s) 115 included in the kit 100 may be those parts that are installable along with the replacement part 110 (e.g. at a location in the vehicle proximate to the replacement part 110) and are likely to need replacement in the near future (e.g. based on the mileage of the vehicle 20 or simply because they are commonly replaced). It is envisioned that an auto parts store or other retailer may sell multiple tiers of kits 100 for implementing a given repair solution on a particular vehicle 20, for example, i) a basic kit 100 at a first price point that provides the replacement part(s) 110, tool(s) 120, instructions, and any required secondary parts, and ii) a premium kit 100 at a higher price point that provides everything that the basic kit 100 provides plus one or more optional parts 115 as described above (along with any associated tools 120, instructions, and secondary parts).

Depending on the nature of the replacement part(s) 110, each kit 100 may be associated with an urgency level. For example, if the replacement part(s) 110 is brake pad(s), the urgency to repair the diagnostic condition of the vehicle 20 may be considered high, as a failure of the brakes while driving can lead to a collision. A kit 100 for replacing a mass airflow sensor may be considered to have a low urgency by comparison. In order to convey this urgency information to a buyer or a seller of the kit 100, the indicator 140 on the kit may comprise an urgency rating associated with the diagnostic condition. The urgency rating may be encoded in a range of colors (e.g. red for urgent, yellow for recommended, green for optional), letters, numbers, or other symbols to quickly and intuitively convey the urgency information to the relative party. It is contemplated that an auto parts store or other seller may arrange the kits 100 on a shelf or on a website based on their urgency ratings. For example, the seller might arrange the kits 100 first according to the particular vehicle(s) that the kit 100 is compatible with (as determined from the indicator 140) and then, within each section devoted to a specified vehicle(s), according to their urgency ratings. In this way, while browsing the kits 100 that are compatible with his or her vehicle 20, a buyer might easily see which kits 100 are used for more and less urgent repairs. This may be especially useful in a case where the buyer does not have an immediate need for a replacement part 110 and is instead thinking of purchasing one or more kits 100 in advance. For instance, it may be worthwhile to have a kit 100 with an urgent replacement part 110 on hand prior to needing the repair, especially if the buyer has no second vehicle to shop for the kit 100 with in case the need for the urgent replacement part 110 arises. On the other hand, kits 100 used for less urgent repairs might more easily be purchased after they are needed since the vehicle 20 may still be safe to drive. By the same token, the auto parts store or other seller may use the urgency ratings to determine which kits 100 to stock in order to maintain availability of urgent replacement parts 110 for immediate purchase, whereas less urgent kits 100 (especially less commonly purchased or less profitable kits 100) may have lower priority when it comes to restocking.

To produce the kits 100, the exemplary system 10 may further include a DIY auto repair apparatus 300, which may take the form of one or more networked servers (e.g. a cloud network), for example. The apparatus 300 may include a solution data storage 310 that embodies a database storing a plurality of vehicle repair records in association with vehicle specific diagnostic information (e.g. DTCs) and an associated one or more vehicle year, make, model, and/or engine. In general, this data may be used for diagnosing a vehicle according to DTCs output by a scan tool 200, 200a and/or symptomatic information, for example. Exemplary diagnostic methods, including the use of such diagnostic data to arrive at a most likely root cause and repair solution, are described in U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,068,951, entitled VEHICLE DIAGNOSTIC SYSTEM, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FIXED SOLUTION CAPABILITY, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 9,824,507, entitled MOBILE DEVICE BASED VEHICLE DIAGNOSTIC SYSTEM, U.S. Pat. No. 10,643,403, entitled PREDICTIVE DIAGNOSTIC METHOD AND SYSTEM, U.S. Patent Application Pub. No. 2013/0297143, entitled METHOD OF PROCESSING VEHICLE DIAGNOSTIC DATA, U.S. Patent Application Pub. No. 2019/0304208, entitled SYSTEM AND METHOD FOR PROACTIVE VEHICLE DIAGNOSIS AND OPERATIONAL ALERT, and U.S. Patent Application Pub. No. 2019/0304213, entitled SYSTEM AND METHOD FOR PROACTIVE VEHICLE DIAGNOSIS AND OPERATIONAL ALERT, the entire contents of each of which is expressly incorporated herein by reference. A subset of common vehicle diagnostic conditions associated with specific vehicles from among entries of the database may be generated by a common vehicle repair solution generator 320 of the apparatus 300. The subset of common vehicle diagnostic conditions may be generated on the basis of data collected from various sources, including automotive service shops and auto parts stores, and may be periodically updated as certain diagnostic conditions and associated repair solutions become more or less common with the changing features of vehicle models and with the advent of new technologies. In addition to how common a vehicle diagnostic condition is, the common vehicle repair solution generator 320 may further take into account the costs of replacement parts and tools and the degree of difficulty of the repair. Since the subset of common vehicle diagnostic conditions will inform the apparatus 300 as to which kits 100 should be manufactured, various factors such as cost and difficulty of repair may be taken into account depending on the practicalities of providing a particular kit 100 to consumers. The subset of common vehicle diagnostic conditions may be stored in the same or a separate database, which may be embodied by a DIY repair kit data storage 330 as represented in FIG. 1.

The apparatus 300 may further include a label generator 340. For each of the common vehicle diagnostic conditions, the label generator 340 may generate a label including the indicator 140 to be provided on the packaging 130 of each kit 100. The label including the indicator 140 may be a physical label such as a tag or sticker or may be merely the designation of alphanumeric text, machine-readable code such as a bar code (e.g. a QR code), a radio frequency identification (RFID) tag, etc. that may thereafter be printed on such a physical tag or sticker, directly printed on or within the packaging 130 (e.g. so as to be visible from outside the packaging 130, such as through a transparent window), or otherwise provided to the packaging 130 in a manner that is accessible to a potential buyer (e.g. as in the case of an RFID tag which need not necessarily be visible). The indicator 140 may indicate any of various information stored in the DIY repair kit data storage 330 so long as it serves to link the kit 100 with a particular vehicle diagnostic condition and/or repair solution. For example, in a case where the kit 100 is to be compatible with any scan tool 200 or diagnostic mobile application installed on a mobile device 220*a* in communication with a dongle-type scan tool 200*a*, the indicator 140 may indicate the vehicle model and the one or more DTCs or other vehicle diagnostic information corresponding to the vehicle diagnostic condition that the kit 100 is designed to repair on that specific vehicle model. In this way, as explained above, a buyer need only compare the ordinary output of a conventional scan tool 200 or mobile application to the indicator 140 on the packaging 130 of a kit 100 to know whether the kit 100 can be used to address the diagnostic condition of the buyer's vehicle 20.

In some implementations, the label generator 340 need only generate a kit identifier of the kit 100 itself as the indicator 140, rather than any DTC or other diagnostic information or even vehicle-identifying information. The kit identifier may serve simply as an identifier for the kit 100, that is, for the contents of the kit 100 (e.g. a particular replacement part 110 and tool(s) 120). In this case, the indicator 140 may still be linked to a particular vehicle diagnostic condition by virtue of an association between kit identifiers and common vehicle diagnostic conditions in the DIY repair kit data storage 330. For example, each time a new common vehicle diagnostic condition is stored in the DIY repair kit data storage 330, a kit identifier may be generated and stored in association therewith. The label generator 340 may then reference that same kit identifier when generating the label containing the indicator 140 to be provided for a corresponding kit 100.

In order to support such an implementation, in which the indicator 140 on the packaging 130 of a kit 100 only identifies the kit 100 and not the corresponding vehicle diagnostic information directly, it is envisioned that the kit-identifying information contained in the DIY repair kit data storage 330 may thereafter be presented to the user as part of the diagnosis of the vehicle 20. As schematically depicted in FIG. 1, for example, the apparatus 300 may further include a diagnosis and solution engine 350 that provides backend diagnostic functionality to a scan tool 200, 200*a* connected to an onboard computer 22 of the vehicle 20 (e.g. via an OBD-II port). The scan tool may be a standalone device 200 having the capability of connecting to a remote server over a network such as the Internet. Such a device 200 may be a handheld device as illustrated, which may contain a wireless transceiver for example, or may be a stationary kiosk that may have a wireless or wired connection to the network. Alternatively, the scan tool may comprise a dongle 200*a* that connects to the vehicle 20 and obtains diagnostic data therefrom but may have limited display capabilities and lack long-range communication functionality. Such a dongle-type scan tool 200*a* may be used together with a smartphone, tablet, or other mobile device 220*a* that is generally owned by members of the public, which may be enabled by a mobile application (downloadable on an app store, for example) to communicate with the dongle 200*a* over a wired connection or short-range wireless connection such as Bluetooth. In this case, the display 210*a* of the app-loaded mobile device 220*a* may serve the same function as the screen 210 of the standalone scan tool 200, and likewise the wireless transceiver of the mobile device 220*a* may provide the long-range communication link with the remote server.

Generally speaking, the diagnosis and solution engine 350 may communicate with the scan tool 200 or app-loaded mobile device 220*a* to interpret DTCs and other diagnostic data downloaded from the onboard computer 22, for example, captured live and freezeframe data and vehicle-identifying information such as year, make, model, trim data encoded in a vehicle identification number (VIN). For example, the diagnosis and solution engine 350 may use such diagnostic data including vehicle-identifying information as an index to look up the most likely solution for the diagnostic condition of the vehicle (also referred to as the most likely "fix" or in some cases the diagnosis of the vehicle) in the solution data storage 310. The diagnosis and solution engine 350 may then provide these results to the scan tool 200 or mobile device 220*a* to be displayed on the screen 210, 210*a* thereof. By referencing the DIY repair kit data storage 330, the diagnosis and solution engine 350 may further check whether the determined vehicle diagnostic condition is one of the common vehicle diagnostic conditions contained therein. If it is, the diagnosis and solution engine 350 may match the vehicle diagnostic condition with a kit identifier corresponding to a kit 100 that may be used to perform the associated repair. The diagnosis and solution engine 350 may provide the kit identifier to the scan tool 200 or mobile device 220*a* to be displayed on the screen 210, 210*a* together with the corresponding diagnostic condition and/or most likely repair solution.

From the perspective of the user of the scan tool 200, 200*a*, the particular kit 100 that should be purchased to repair the vehicle 20 is immediately known from the kit identifier that is displayed on the screen 210, 210*a*. The kit 100 may then easily be found in a store or ordered online. In some cases, the scan tool 200 or app-loaded mobile device 220*a* may further provide information about where to buy the kit 100, such as the name of a store near the user (e.g. as determined by location data known from a GPS receiver in the scan tool 200 or mobile device 220*a* or onboard the vehicle 20) or a URL or other Internet address for purchasing the kit 100 online. Such information, which may be provided by an auto parts retailer or other potential beneficiary of the disclosed system 10, may be stored in the DIY repair kit data storage 330, for example, along with current availability of the kit 100, price, etc. Any such information related to the kit 100 may thus be provided to the scan tool 200 or mobile device 220*a* by the diagnosis and solution engine 350 when the scan tool 200 or mobile device 220*a* communicates with the apparatus 300 to diagnose the vehicle 20.

FIG. 2 shows example contents of the DIY repair kit data storage 330, which may store the subset of common vehicle diagnostic conditions as described above. For ease of explanation, a tabular data structure is illustrated to represent associations between various items of data. In particular, a single row of the data structure may correspond to a single kit 100, either one that has already been assembled or one that is yet to be assembled. Each different kit 100 may be given a kit identifier 331 (e.g. $ID_1$, $ID_2$, $ID_3$, ... $ID_n$ where n is the number of different kits 100). The kit identifier 331 may serve as a product number for a given kit 100, distinguishing it from other kits 100 containing different replacement parts 110, tools 120, and/or instructions. As noted above, a new kit identifier 331 may be assigned each time a new common vehicle diagnostic condition is stored in the DIY repair kit data storage 330. As such, the data structure shown in FIG. 2 has a vehicle repair solution or diagnostic condition 332 (e.g. $Fix_1$, $Fix_2$, $Fix_3$, ... $Fix_n$) associated with each kit identifier 331. This entry may represent the vehicle-specific solution corresponding to a particular diagnostic condition of a vehicle having a particular year, make, model, and trim/engine, such as "replace mass air flow sensor on a 2011-2016 Dodge Charger," and may constitute the purpose of the repair to be performed using the kit 100. The vehicle diagnostic condition 332 may be the same information that is generally output to the user of a scan tool 200, 200*a* by the diagnosis and solution engine 350 based on the data stored in the solution data storage 310 (i.e. even for those less common or more difficult or costly repair solutions that might not be repairable by the kits 100 described herein). The vehicle diagnostic condition 332 may also include information about the urgency of the repair, which may be referred to by the label generator 340 and/or diagnosis and solution engine 350 for determining the urgency rating associated with the kit 100 as described above.

Each entry in the data structure of FIG. 2 may also include underlying diagnostic data 333 that points to the particular vehicle diagnostic condition 332. The diagnostic data 333 may correspond to the raw data that is collected from the onboard vehicle computer 22 by a scan tool 200, 200*a* and may include, for example, a combination of diagnostic trouble codes (DTCs), ranges of values of live or freezeframe data captured from an electronic control unit (ECU) or other vehicle systems, and/or vehicle data such as a plurality of vehicle models or, more specifically, year, make, model, trim data as may be found in a vehicle identification number (VIN) of an applicable vehicle for the particular repair solution. A given set of diagnostic data 333 may point to a particular vehicle diagnostic condition 332 according to any of various methods, including those described in the prior patent documents incorporated by reference above. As noted above, these same methods may be performed by the diagnosis and solution engine 350 using the solution data storage 310 (see FIG. 1) when diagnosing a vehicle 20 based on diagnostic data received from a scan tool 200, 200*a*. By storing a set of diagnostic data 333 in association with each kit 100, the DIY repair kit data storage 330 of FIG. 2 may be used by the label generator 340 to generate an appropriate indicator 140 on the packaging 130 of each kit 100, informing potential buyers which kits 100 are suitable for addressing which combinations of diagnostic data (e.g. which repair code(s) of which specific vehicle(s)). As noted above, however, the indicator 140 on the packaging 130 of each kit 100 may instead indicate only the kit identifier 331 (or other information such as the vehicle diagnostic condition 332), with the same kit identifier or other information being displayed to the potential buyer on the screen 210, 210*a* of the scan tool 200 or app-loaded mobile device 220*a* to assist in finding the correct kit 100. In this case, the underlying diagnostic data 333 need not be stored in the DIY repair kit data storage 330.

The DIY repair kit data storage 330 may further include various information related to the assembly of each kit 100, such as kit contents 334 and package specifications 335. As represented in FIG. 2, the kit contents 334 of each kit 100 may include one or more replacement parts 110 (e.g. $Part_1$, $Part_2$, $Part_1$, ... $Part_n$) and one or more tools 120 (e.g. $Toolset_1$, $Toolset_2$, $Toolset_3$, ... $Toolset_n$), as well as any required secondary parts that must be replaced when installing the replacement part 110 and/or any optional parts 115 that may be installed at the same time for the sake of efficiency as described above. In the case where the inclusion of optional parts 115 defines multiple tiers of the same kit 100 (e.g. basic and premium), the different tiers may have the same or different kit identifier 331. The package specifications 335 may include dimensions (e.g. L×W×H), material, weight, shape/design, etc. In addition to informing the label generator 340 of relevant considerations for generating the label or other indicator 140 that will be provided on the packaging 130 of each kit 100, this information may also in some cases be provided to the scan tool 200 or mobile device 220a to be presented to the user on the screen 210, 210a along with the kit identifier 331, possibly accessible by drilling down on a displayed kit identifier 331 (e.g. by selecting the kit identifier 331 with a softkey or other user interface element of the scan tool 200 or mobile device 220a, such as a touch screen in the case of a typical smartphone).

In some cases, product data 336 such as remaining inventory or backorder status, price, store availability, e-commerce website availability, etc. may also be stored in the DIY repair kit data storage 330 in association with each kit 100. For example, the entity that provides the DIY auto repair apparatus 300 and associated services may be an auto parts seller or may have a contractual relationship with one or more auto parts sellers or other retailers granting access to the information contained in one or more parts databases. Such information may be stored as product data 336 in the DIY repair kit data storage 330, and a relevant subset of such product data 336 may be presented to the user on the screen 210 of the scan tool 200 or mobile device 220a (e.g. by drilling down). For example, a relevant subset of product information 336 may include availability and price of a kit 100 near the user's current location (e.g. as determined by GPS) or in the user's region, limited time discounts, hyperlinks to e-commerce websites having the kit 100 in stock, etc.

Figure 3:
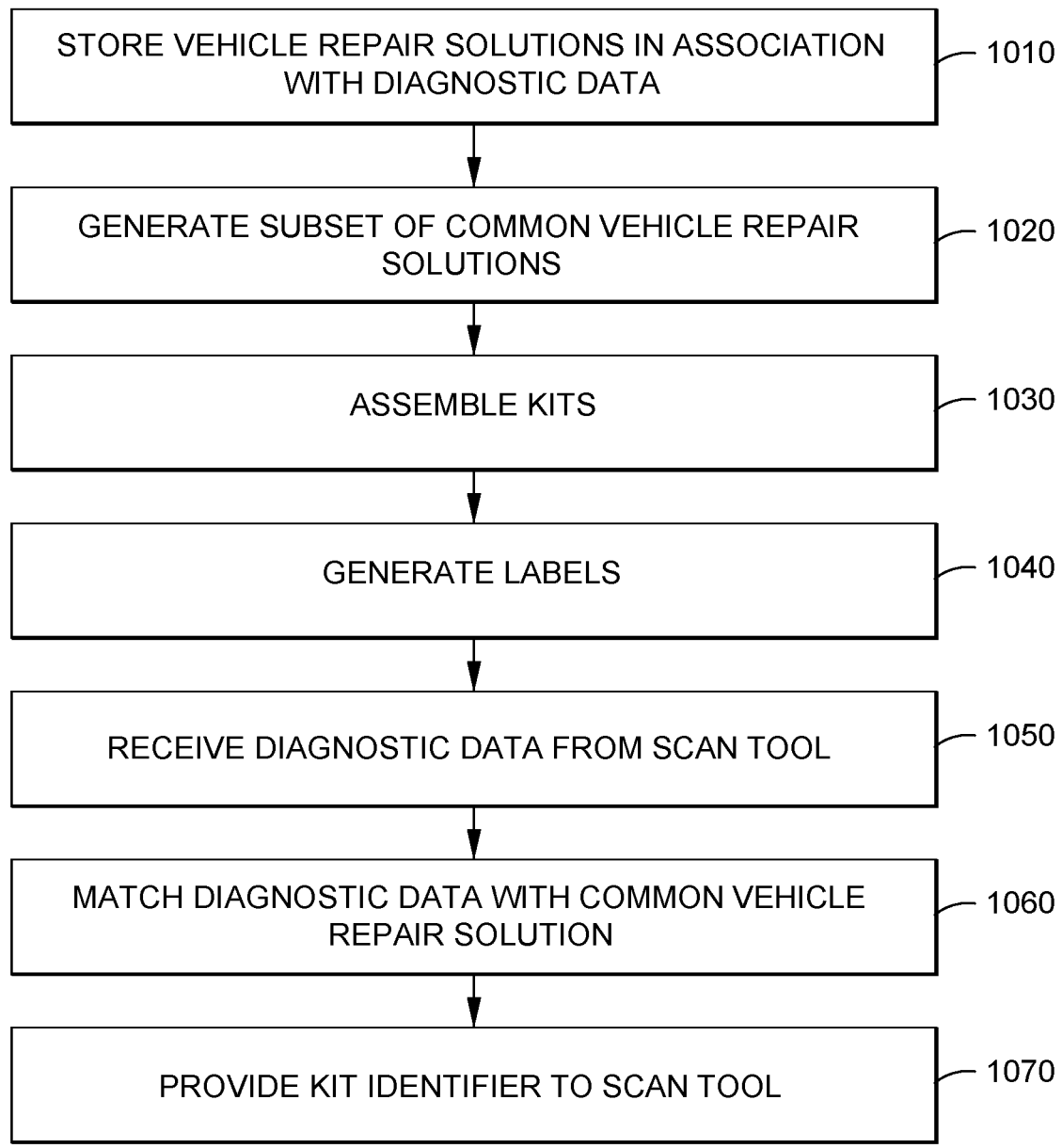
FIG. 3 shows an example operational flow according to an embodiment of the present disclosure.

FIG. 3 shows an example operational flow according to an embodiment of the present disclosure. The operational flow may be performed, in whole or in part, by one or more elements of the system 10 shown and described in relation to FIG. 1. The operational flow of FIG. 3 may begin with storing vehicle repair solutions or diagnostic conditions in association with diagnostic data (step 1010). For example, the DIY auto repair apparatus 300 shown in FIG. 1 may store vehicle diagnostic conditions in a diagnosis data storage 310 for use in addressing the most likely root cause of vehicle trouble experienced by a driver of a vehicle 20, warning indicators that are lit on the vehicle's dashboard, and/or other symptoms. In general, a vehicle diagnostic condition stored in association with diagnostic data may be selected (e.g. by the diagnosis and solution engine 350) by matching diagnostic data captured from the vehicle 20 by a scan tool 200, 200a, including DTCs, live and freezeframe data, and/or vehicle-identifying data as discussed above. Such matching may in some cases entail complex algorithms taking into account combinations of DTCs, live data, and vehicle history, as well as other factors including how often a particular vehicle diagnostic condition appears in the solution data storage 310, for example. For purposes of this disclosure, any data relevant to applying such matching algorithms to choose a most likely vehicle repair solution may be regarded as diagnostic data that is stored in association with the vehicle diagnostic conditions in the solution data storage 310.

The operational flow of FIG. 3 may continue with generating a subset of common vehicle repair solutions or diagnostic conditions (step 1020). For example, the common vehicle repair solution generator 320 of the apparatus 300 may periodically copy vehicle diagnostic conditions from the solution data storage 310 into the DIY repair kit data storage 330 according to various criteria, including how often a given vehicle diagnostic condition is found to be the root cause of vehicle trouble (e.g. as determined by the diagnosis and solution engine 350), how complicated the associated repair procedure is, the cost of the needed parts and tools for the repair, the number of applicable vehicle models, etc. Such criteria may be evaluated autonomously by applying appropriate thresholds to quantify how common a vehicle diagnostic condition is, how expensive or complicated the repair is, etc. and/or by machine learning (e.g. a neural network), for example. In some cases, a recommended subset of common vehicle diagnostic conditions may be output for review by decisionmakers to determine which kits 100 should be assembled at a given time. As noted above, generating the subset of common vehicle diagnostic conditions may also include generating kit identifiers 331 (see FIG. 2) to be associated with each common vehicle diagnostic condition and thus each kit 100. The common vehicle repair solution generator 320 may generate and store the kit identifiers 331 in the DIY repair kit data storage 330. As explained above, the common vehicle repair solution generator 320 may further store relevant ranges and combinations of underlying diagnostic data (e.g. vehicle data, DTCs, live data) in the DIY repair kit data storage 330 for purposes of including this information on the packaging 130 of each kit 100 in some implementations. Any other information that may be conveyed by the indicator 140, such as an urgency rating, may also be stored in the DIY repair kit data storage 330.

As described above, it is contemplated that the kits 100 to be produced may include optional parts 115 to be installed at the same time as the replacement part(s) 110 for the sake of efficiency. To this end, in addition to storing the most likely vehicle repair solution in association with each set of diagnostic data, the solution data storage 310 may further store one or more predictive diagnostics recommendations in association therewith. For example, based on the mileage of the vehicle 20 and the known layout of the engine or other portion of the vehicle 20 where the replacement part(s) 110 will be installed, the solution data storage 310 may associate the vehicle diagnostic condition with a predictive diagnostics recommendation to replace a nearby part that is likely to need replacement in the future and is difficult to access on that specific vehicle 20. The predictive diagnostics recommendation may similarly be determined by machine learning, for example. Based on this predictive diagnostics recommendation, the common vehicle repair generator 320 may designate one or more optional part(s) 115 to be stored as kit contents 334 corresponding to that particular vehicle diagnostic condition 332 in the DIY repair kit data storage 330.

Once it is determined which kits 100 should be assembled, either periodically or on a rolling basis as the subset of common vehicle diagnostic conditions changes, the kits 100 themselves may be assembled (step 1030). As described above and shown by way of example in FIG. 1, each kit 100 may contain one or more replacement parts 110 and tools 120 (and in some cases secondary parts and optional parts 115), along with relevant instructions that may be aimed at professionals and/or members of the general public who might not be skilled mechanics. Information related to the assembly of each kit 100, such as kit contents 334 and package specifications 335, may be stored in the DIY repair kit data storage 330 (see FIG. 2). During step 1030, or in some cases before or after step 1030, labels may be generated for each kit 140 (step 1040), with each label including an indicator 140 of the kit identifier 331 and/or the underlying diagnostic data (e.g. vehicle data, DTCs, live data) corresponding to the specific diagnostic condition in the specific vehicle model that is repairable by that kit 100. As noted above, the latter data may be provided on the packaging 130 of each kit 100 in cases where a scan tool 200, 200a (e.g. a legacy scan tool) might not have access to a DIY repair kit data storage 330 and might only output diagnostic data without knowledge of the kits 100. The indicator 140 may further include an urgency rating and any other information useful to a buyer or seller of the kit 100. The completed kits 100 may then be provided to distributors, retailers, and e-commerce sites for warehousing and sale to auto repair shops and the general public.

In implementations in which the indicator 140 on the packaging 130 of the kit 100 only shows a kit identifier 331 (and possibly one or more vehicle models, urgency rating, etc.) but does not indicate the underlying DTCs or other diagnostic data, the apparatus 300 may still point the potential buyer to the correct kit 100 by providing the kit identifier 331 to the scan tool 200 or app-loaded mobile device 220a. To this end, the operational flow of FIG. 3 may continue with receiving diagnostic data from the scan tool 200 or mobile device 220a (step 1050) and matching the received diagnostic data with a common vehicle diagnostic condition stored in the DIY repair kit data storage 330 (step 1060). Such matching may be done, for example, by the diagnosis and solution engine 350 as follows. First, the diagnosis and solution engine 350 may determine the most likely vehicle diagnostic condition from the received diagnostic data using the solution data storage 310. This may be done using any of various methods as described above, including those described in the prior patent documents incorporated by reference above. Then, using the determined vehicle diagnostic condition (or the underlying diagnostic data) as an index, the diagnosis and solution engine 350 may look up the kit identifier 331, if any, in the DIY repair kit data storage 330. If there is a match, that is, if the determined vehicle diagnostic condition is one of the common vehicle diagnostic conditions having an entry in the DIY repair kit data storage 330, the diagnosis and solution engine 350 may then provide the kit identifier 331 to the scan tool 200 or mobile device 220a to be displayed on the screen 210, 210a together with or instead of the determined vehicle diagnostic condition and/or repair solution (step 1070). The process may proceed autonomously from connection of the scan tool 200, 200a to the vehicle diagnostic port (or from receipt or transmission of the vehicle information by the scan tool 200, 200a or associated communication device such as mobile device 220a) to identification of the proper kit 100. The user may then simply find the kit 100 matching the kit identifier 331 in a store or online. As noted above, depending on the data that is available in the DIY repair kit data storage 330 (see FIG. 2), the scan tool 200 or mobile device 220a may also display relevant information to assist the user in locating and purchasing the kit 100.

It is also contemplated that the user may not necessarily have any problem with his or her vehicle 20, yet still might be a potential buyer of a kit 100. For example, the user may run a "check-up" diagnostics routine on his or her vehicle using a mobile application installed on his/her mobile device 220a or at a kiosk or other self-service diagnostics station provided at a store that sells the kits 100. On the basis of the received diagnostic data from the user's vehicle 20, the DIY auto repair apparatus 300 may use predictive diagnostics to find one or more kits 100 suitable for the vehicle 20. For example, the user may be pointed to one or more kits 100 based solely on the vehicle model and mileage as read from the vehicle's onboard computer, which may be indicative of the likelihood that a particular part will need to be replaced in the near future (e.g. within a prescribed mileage range). The user may then be presented with a list of such kits 100 along with an indication that they may be "recommended" or "optional" kits 100 as opposed to "urgent" ones. In a case where the user is planning to go on a road trip or to otherwise be far from a convenient service center or auto parts store for some time, the user may find it prudent to purchase such "recommended" or "optional" kits 100 and install one or more replacement parts 110 and/or optional parts 115 in order to ensure that the vehicle is in good condition and will stay in good condition for the foreseeable future. By stocking such "recommended" or "optional" kits 100 (which may be indicated accordingly by urgency ratings), a seller of the kits 100 may leverage predictive diagnostics technology to further increase sales of auto parts.

In the above examples, the kits 100 are assumed to be assembled in advance and stocked in a store or warehouse. However, the disclosed subject matter is not intended to be limited in this regard. For example, the kits 100 may instead be made-to-order. In such an implementation, it may not be necessary to generate a subset of common vehicle diagnostic conditions at all. Instead, upon determining the likely vehicle repair solution to address the diagnostic condition of a vehicle 20 based on diagnostic data obtained from the vehicle 20 as described above, the DIY auto repair apparatus 300 may present to the user (e.g. via the screen 210, 210a of the scan tool 200 or mobile device 220a) an option to order a custom kit 100 including the needed part(s) 110, tool(s) 120, and instructions for the repair. The user may then place the order using the scan tool 200 or mobile application installed on the mobile device 220a. In an implementation in which the provider of the DIY auto repair apparatus 300 is associated with a retail auto parts store, for example, the scan tool 200, 200a (e.g. a kiosk) may be used on site at the store. Upon diagnosing the vehicle, the scan tool 200 or mobile application 220a may place an order with the store to assemble the appropriate custom kit 100 and bring it out to the buyer's car for curbside purchase (which may be in especially high demand during the current coronavirus pandemic). By putting the decision of whether to produce a given kit 100 in the hands of the buyer, the provider of the kits 100 can avoid the uncertainty and overhead associated with deciding which kits 100 to assemble based on how common the repairs are, costs, complexity, etc.

To support and enhance the generation of custom kits 100, the DIY auto repair apparatus 300 may further store user data including customer profiles. A name, address, payment info, login credentials, preferences, and other data may be designated in advance for each customer in a respective customer profile. By referring to a customer profile, the apparatus 300 may take into consideration a user's preferences, including, for example, the appearance and content of the label 140, the type of packaging 130, etc., when ordering a custom kit 100 for that user.

The functionality described above in relation to the components of the DIY auto repair apparatus 300 shown in FIG. 1 and the operational flow described in relation to FIG. 3 may be wholly or partly embodied in one or more computers including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g. over the Internet), such as the scan tool 200 or mobile device 220a. By virtue of such communication, the scan tool 200 or app-loaded mobile device 220a may be operable to diagnose a vehicle 20 and identify an appropriate kit 100 as described above.

It is also contemplated that some or all of the functionality of the apparatus 300 may be performed by the scan tool 200, 200a and/or app-loaded mobile device 220a rather than by a remote server or other external computer. In other words, the apparatus 300 or a part thereof may be embodied in the scan tool 200 itself or in the mobile application installed on the smartphone or other mobile device 220a (and/or in a dongle 200a communicatively coupled thereto). For example, a scan tool 200 or app-loaded mobile device 220a may be adapted to include, locally, the diagnosis and solution engine 350, solution data storage 310, and DIY repair kit data storage 330, with the common vehicle repair solution generator 320 and other services being embodied in one or more remote computers (e.g. a cloud service). Such remote computer(s) may periodically update the contents of the DIY repair kit data storage 330 automatically or on demand by the user of the scan tool 200 or mobile device 220. In this way as well, the scan tool 200 or mobile device 220 may be operable to diagnose a vehicle 20 and identify an appropriate kit 100, in this case even while offline. In such an implementation, copies of the solution data storage 310 and DIY repair kit data storage 330 may also be maintained by a backend server that performs other functions related to assembling the kits 100 and includes, for example, the label generator 340.

In some cases, the scan tool 200, 200a, including some or all of the functionality of the DIY auto repair apparatus 300, may be embodied in a drive-up kiosk that may be located at a gas station or other automotive service center or at an auto parts retailer as described above. A vehicle owner who is experiencing a problem with his or her vehicle 20, observing a warning light on the dashboard, or simply interested in a vehicle diagnosis may park his or her vehicle 20 near the kiosk and follow on-screen visual and/or audio instructions presented by the kiosk to plug a cable connected to the kiosk into the OBD-II port or other diagnostic port of the vehicle 20. The kiosk may then retrieve diagnostic data from the onboard computer 22 of the vehicle 20 and diagnose the vehicle as described above. The kiosk may provide the vehicle owner with a kit identifier 331 and a suggestion to purchase the corresponding kit 100 to perform DIY repairs, or with an option to order a custom kit 100.

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The foregoing description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A diagnostic condition indexed kit for implementing a do-it-yourself automotive repair, the kit comprising:
    at least one replacement part compatible with a specified vehicle;
    at least one tool for installing the at least one replacement part in the specified vehicle; and
    packaging containing the at least one replacement part and the at least one tool, the packaging being configured for commercial distribution of the kit and including an indicator, accessible from outside the packaging, referencing the specified vehicle and a diagnostic condition associated with the specified vehicle that is repairable by installation of the at least one replacement part, the indicator comprising at least one repair code and an urgency rating associated with the diagnostic condition.

2. The kit of claim 1, wherein the at least one repair code comprises a plurality of vehicle diagnostic trouble codes (DTCs).

3. The kit of claim 2, wherein the DTCs are generated by the specified vehicle in response to the diagnostic condition associated with the specified vehicle.

4. The kit of claim 1, wherein the urgency rating is indicated by one or more colors applied to the indicator.

5. The kit of claim 1, wherein the urgency rating is derived from an urgency level associated with the diagnostic condition.

6. The kit of claim 1, wherein the urgency rating is derived from an urgency level associated with the at least one replacement part.

7. The kit of claim 1, wherein the kit further comprises at least one optional replacement part that is not needed for repairing the diagnostic condition associated with the specified vehicle, and the indicator comprises a plurality of vehicle diagnostic trouble codes (DTCs) at least one of which is associated with the at least one optional replacement part.

8. The kit of claim 7, wherein an installation location of the at least one optional replacement part in the specified vehicle is made accessible during repair of the diagnostic condition.

9. The kit of claim 7, wherein the at least one optional replacement part is predicted to need replacement when the specified vehicle reaches a specified mileage.

10. A system comprising:
    the kit of claim 1; and
    a scan tool operable to connect to an onboard computer of the specified vehicle and receive the at least one repair code and vehicle-identifying information from the specified vehicle.

11. The system of claim 10, further comprising a server configured to receive, from the scan tool, the at least one repair code and the vehicle-identifying information and to match the at least one repair code and the vehicle-identifying information to a kit identifier.

12. A system comprising:
the kit of claim 1; and
a mobile device in communication with the specified vehicle and operable to receive the at least one repair code and vehicle-identifying information from the specified vehicle and to identify the kit including the at least one replacement part and the at least one tool.

13. A method of providing do-it-yourself automotive repair kits, the method comprising:
storing a plurality of vehicle repair records in a database, each of the vehicle repair records stored in association with vehicle-specific diagnostic information generated by a vehicle and an associated vehicle diagnostic condition;
generating a subset of common vehicle diagnostic conditions associated with specific vehicles from the vehicle repair records in the database;
for each of the common vehicle diagnostic conditions, i) assembling a first corresponding repair kit including one or more vehicle-specific replacement parts compatible with the associated specific vehicle and the vehicle diagnostic condition and one or more tools for installing the one or more vehicle-specific replacement parts in the associated specific vehicle and ii) packing the one or more vehicle-specific replacement parts and the one or more tools in a packaging, the packaging being configured for commercial distribution of the first corresponding repair kit and including an indicator identifying the vehicle and at least one vehicle diagnostic condition associated with that vehicle that is addressed by installation of the one or more vehicle-specific replacement parts; and,
for at least one of the common vehicle diagnostic conditions, i) assembling a second corresponding repair kit including the one or more vehicle-specific replacement parts compatible with the associated specific vehicle and the vehicle diagnostic condition, the one or more tools for installing the one or more vehicle-specific replacement parts in the associated specific vehicle, and at least one optional replacement part that is not needed for repairing the vehicle diagnostic condition of the associated specific vehicle and is not included in the first corresponding repair kit and ii) packing the one or more vehicle-specific replacement parts, the one or more tools, and the at least one optional replacement part in a packaging, the packaging being configured for commercial distribution of the second corresponding repair kit and including an indicator identifying the vehicle and at least one vehicle diagnostic condition associated with that vehicle that is addressed by installation of the one or more vehicle-specific replacement parts.

14. The method of claim 13, wherein the indicator includes at least one vehicle diagnostic trouble code (DTC) included within the vehicle-specific diagnostic information.

15. The method of claim 14, further comprising indexing the assembled repair kits in accordance with the associated specific vehicle and the at least one DTC.

16. The method of claim 13, wherein, for the at least one of the common vehicle diagnostic conditions, the indicator included in the packaging of the second corresponding repair kit comprises a plurality of vehicle diagnostic trouble codes (DTCs) at least one of which is associated with the at least one optional replacement part.

17. The method of claim 13, wherein the at least one optional replacement part is predicted to need replacement when the associated specific vehicle reaches a specified mileage.

18. The method of claim 13, wherein an installation location of the at least one optional replacement part in the associated specific vehicle is made accessible during repair of the vehicle diagnostic condition.

19. The method of claim 13, further comprising, for at least one of the common vehicle diagnostic conditions, i) assembling a third corresponding repair kit including the one or more vehicle-specific replacement parts compatible with the associated specific vehicle and the vehicle diagnostic condition, the one or more tools for installing the one or more vehicle-specific replacement parts in the associated specific vehicle, the at least one optional replacement part, and at least one further optional replacement part that is not needed for repairing the vehicle diagnostic condition of the associated specific vehicle and is not included in either of the first and second corresponding repair kits and ii) packing the one or more vehicle-specific replacement parts, the one or more tools, the at least one optional replacement part, and the at least one further optional replacement part in a packaging, the packaging including an indicator identifying the vehicle and at least one vehicle diagnostic condition associated with that vehicle that is addressed by installation of the one or more vehicle-specific replacement parts.

20. The method of claim 19, wherein, for the at least one of the common vehicle diagnostic conditions, the indicator included in the packaging of the third corresponding repair kit comprises a plurality of vehicle diagnostic trouble codes (DTCs) at least one of which is associated with the at least one further optional replacement part.

21. The method of claim 19, wherein the at least one further optional replacement part is predicted to need replacement when the associated specific vehicle reaches a specified mileage.

22. The method of claim 19, wherein an installation location of the at least one further optional replacement part in the associated specific vehicle is made accessible during repair of the vehicle diagnostic condition.

23. A non-transitory program storage medium on which are stored instructions executable by a processor or programmable circuit to perform operations for supporting a do-it-yourself automotive repair, the operations comprising:
receiving one or more repair codes and vehicle-identifying information from a vehicle;
identifying a repair kit based on the one or more repair codes and the vehicle identifying information, the repair kit including at least one replacement part compatible with the vehicle, at least one tool for installing the at least one replacement part in the vehicle, and packaging containing the at least one replacement part and the at least one tool, the packaging being configured for commercial distribution of the repair kit and including an indicator, accessible from outside the packaging, referencing a kit identifier corresponding to the repair kit, the indicator comprising at least one repair code and an urgency rating associated with a vehicle diagnostic condition derived from the one or more repair codes; and
outputting the kit identifier corresponding to the identified repair kit.

24. The non-transitory program storage medium of claim 23, wherein the identifying includes transmitting the one or more repair codes and the vehicle identifying information to a remote server and receiving the kit identifier from the remote server.

25. The non-transitory program storage medium of claim 23, wherein the urgency rating is derived from an urgency level associated with the diagnostic condition.

26. The non-transitory program storage medium of claim 23, wherein the urgency rating is derived from an urgency level associated with the at least one replacement part.

27. A diagnostic condition indexed kit for implementing a do-it-yourself automotive repair, the kit comprising:
   at least one replacement part compatible with a specified vehicle;
   at least one tool for installing the at least one replacement part in the specified vehicle; and
   packaging containing the at least one replacement part and the at least one tool, the packaging being configured for commercial distribution of the kit and including an indicator, accessible from outside the packaging, referencing the specified vehicle and a diagnostic condition associated with the specified vehicle that is repairable by installation of the at least one replacement part, the indicator comprising at least one repair code,
   wherein the kit further comprises at least one optional replacement part that is not needed for repairing the diagnostic condition associated with the specified vehicle, the packaging further containing the at least one optional replacement part.

28. The diagnostic condition indexed kit of claim 27, wherein the indicator comprises a plurality of vehicle diagnostic trouble codes (DTCs) at least one of which is associated with the at least one optional replacement part.

29. The kit of claim 28, wherein the DTCs are generated by the specified vehicle in response to the diagnostic condition associated with the specified vehicle.

30. A system comprising:
   the kit of claim 27; and
   a scan tool operable to connect to an onboard computer of the specified vehicle and receive the at least one repair code and vehicle-identifying information from the specified vehicle.

31. The system of claim 30, further comprising a server configured to receive, from the scan tool, the at least one repair code and the vehicle-identifying information and to match the at least one repair code and the vehicle-identifying information to a kit identifier.

32. A method of providing do-it-yourself automotive repair kits, the method comprising:
   storing a plurality of vehicle repair records in a database, each of the vehicle repair records stored in association with vehicle-specific diagnostic information generated by a vehicle and an associated vehicle diagnostic condition;
   generating a subset of common vehicle diagnostic conditions associated with specific vehicles from the vehicle repair records in the database; and,
   for each of the common vehicle diagnostic conditions, i) assembling a first corresponding repair kit including one or more vehicle-specific replacement parts compatible with the associated specific vehicle and the vehicle diagnostic condition and one or more tools for installing the one or more vehicle-specific replacement parts in the associated specific vehicle and ii) packing the one or more vehicle-specific replacement parts and the one or more tools in a packaging, the packaging being configured for commercial distribution of the first corresponding repair kit and including an indicator identifying the vehicle and at least one vehicle diagnostic condition associated with that vehicle that is addressed by installation of the one or more vehicle-specific replacement, the indicator comprising at least one repair code and an urgency rating associated with the at least one vehicle diagnostic condition.

33. The method of claim 32, wherein the urgency rating is indicated by one or more colors applied to the indicator.

34. The method of claim 32, wherein the urgency rating is derived from an urgency level associated with the at least one vehicle diagnostic condition.

35. The method of claim 32, wherein the urgency rating is derived from an urgency level associated with the one or more vehicle-specific replacement part.

36. The method of claim 32, wherein the indicator includes at least one vehicle diagnostic trouble code (DTC) included within the vehicle-specific diagnostic information.

37. The method of claim 36, further comprising indexing the assembled repair kits in accordance with the associated specific vehicle and the at least one DTC.

38. A non-transitory program storage medium on which are stored instructions executable by a processor or programmable circuit to perform operations for supporting a do-it-yourself automotive repair, the operations comprising:
   receiving one or more repair codes and vehicle-identifying information from a vehicle;
   identifying a repair kit based on the one or more repair codes and the vehicle identifying information, the repair kit including at least one replacement part compatible with the vehicle, at least one tool for installing the at least one replacement part in the vehicle, and packaging containing the at least one replacement part and the at least one tool, the packaging being configured for commercial distribution of the repair kit and including an indicator, accessible from outside the packaging, referencing a kit identifier corresponding to the repair kit, the repair kit further including at least one optional replacement part that is not needed for repairing a vehicle diagnostic condition derived from the one or more repair codes, the packaging further containing the at least one optional replacement part; and
   outputting the kit identifier corresponding to the identified repair kit.

* * * * *